(12) United States Patent
Batz-Sohn et al.

(10) Patent No.: US 6,190,778 B1
(45) Date of Patent: Feb. 20, 2001

(54) PROCESS FOR JOINING TWO SOLID BODIES AND THE RESULTANT STRUCTURAL ELEMENT

(75) Inventors: Christoph Batz-Sohn, Hanau; Gertrud Krauter; Ulrich Gosele, both of Halle, all of (DE)

(73) Assignee: Degussa-Huls Aktiengesellschaft, Frankfurt am Main (DE)

(*) Notice: Under 35 U.S.C. 154(b), the term of this patent shall be extended for 0 days.

(21) Appl. No.: 09/299,920

(22) Filed: Apr. 28, 1999

(30) Foreign Application Priority Data

Apr. 28, 1998 (DE) ............................... 198 18 962

(51) Int. Cl.$^7$ ............................... B32B 7/12; B32B 31/12
(52) U.S. Cl. .................... 428/448; 156/60; 156/272.2; 156/306.3; 156/314; 438/455
(58) Field of Search ............................... 156/272.2, 275.7, 156/273.7, 281, 306.3, 310, 314, 60; 438/455, 679, 770, 771; 428/446, 447, 448; 252/182.17, 182.3

(56) References Cited

U.S. PATENT DOCUMENTS 5,368,942  11/1994  Smith et al. .
5,421,953  6/1995  Nagakubo et al. .

FOREIGN PATENT DOCUMENTS

4404931 A1  8/1994  (DE) .
4409931 A1  9/1995  (DE) .

OTHER PUBLICATIONS

Steinkirchner et al. "Silicon Wafer Bonding via Designed Monolayers", 6156 Advanced Materials, pp. 662–665, No. 7, Jul. 7, 1995.

Deschler et al. "3–Chloropropyltrialkoxysilanes—Key Intermediates for the Commerical Production of Organo-functionalized Silanes and Polysiloxanes", Angew. Chem. Int. Ed. Engl. pp. 236–252, 25 (1986).

Gosele et al., "History and Future of Semiconductor Wafer Bonding", Solid State Phenomena, vol. 47–48, pp. 33–44, (1996).

*Primary Examiner*—Michael W. Ball
*Assistant Examiner*—Michael A Tolin
(74) *Attorney, Agent, or Firm*—Pillsbury Madison & Sutro LLP

(57) ABSTRACT

A process for joining two solid bodies, in particular of silicon. via the substantially smooth surfaces that have first of all been coated with a monomolecular layer of a sulfur-containing organosilane, and the resultant solid bodies, which may be used in microelectronics or micromechanics.

9 Claims, 1 Drawing Sheet

PROCESS FOR JOINING TWO SOLID BODIES AND THE RESULTANT STRUCTURAL ELEMENT

CROSS-REFERENCE TO RELATED APPLICATION

This application is based on German Application DE 198 18 962.1, filed Apr. 28, 1998, which disclosure is incorporated herein by reference.

1. Field of the Invention

The present invention relates to a process for joining two solid bodies via their substantially smooth surfaces that have first of all been coated with a monomolecular layer of a sulfur-containing organosilane, and the resultant composite solid bodies.

2. Background of the Invention

It is known that sufficiently smooth and clean solid body surfaces can be joined to one another at room temperature via adhesion forces. The initially weak interactions are intensified to such an extent by heat treatment, which in the case where silicon solid bodies are used is carried out at temperatures between 800 and 1100° C., that the solid bodies can no longer be separated from one another. This process, which is described in the literature under the headings "Wafer bonding", "Direct bonding" or "Fusion bonding", has in the meantime achieved importance both in microelectronics and in Microsystems technology.

A review of the previous developments in this field may be found for example in the articles "History and Future of Semiconducter Wafer Bonding", U. Gösele, H. Stenzel, M. Reiche, T. Martini, H. Steinkirchner und Q.-Y. Tong in "Solid State Phenomena" 47 & 48, pp. 33 to 44 (1995).

Wafer bonding is not restricted to joining silicon solid bodies. Many other materials can be joined to one another in this way. Problems arise however from, among other factors, the high temperatures that are required in order to achieve an acceptable bonding strength. As a result, structural elements that contain temperature-sensitive structures, as well as material combinations in which the individual components have different coefficients of thermal expansion, cannot at the present time be bonded sufficiently strongly.

A process has also been proposed in which the wafer bonding of silicon wafers can be carried out at room temperature. This process requires however that the surfaces be free of adsorbates, which can be achieved only in an ultrahigh vacuum. In this connection the necessary cleanness can be achieved either by a thermal treatment at high temperatures, which means that this process too is unsuitable for temperature-sensitive structures, or alternatively a plasma etching process has to be employed. This procedure too involves heating the wafers. Even if a high strength could be achieved with a process carried out at room temperture, it is however no longer possible to separate the structures bonded in this way.

SUMMARY OF THE INVENTION

A process of this type is described for example in DE-OS 44 09 931. This specification describes first of all as prior art a process for the direct bonding of silicon wafers, in which the surfaces of silicon wafers have first of all been highly polished, treated with a mixture of $H_2SO_4$ und $H_2O_2$ solutions in order to render the surfaces of the wafers hydrophilic (in order to produce a high density of hydroxide groups), and are then brought together into intimate or close contact at room temperature while water is present between them. The wafers are then heat treated in order to eliminate the water between the wafers by the reaction with silicon, and to join the wafers by covalent silicon-oxygen bonds.

Also, in some variants of the invention according to DE-OS 44 09 931 water molecules are applied to the surface of the wafers to be joined, but only in order to form hydroxide groups on these surfaces. The remaining water molecules are then removed, and in fact before the wafers are bonded to one another.

Accordingly, in neither of the two cases is there an intermediate layer between the wafers bonded to one another, but simply covalent bonds formed by condensation of the hydroxide groups.

The bonding of two solid bodies via their previously heated smooth surfaces is described in a non-prior-published application.

Surfaces hydrophilic per se are hydrophobed by reaction for example with alkyltrialkoxysilanes.

A firm bonding of such treated surfaces then takes place as a result of a physical entanglement of the long-chain alkyl radicals. Covalent bonds cannot be formed on account of the lack of reactivity of the alkyl radicals.

In another known process the Langmuir-Blodgett technique is used to coat the surfaces, which however is a complicated and costly procedure.

The object of the invention is to provide a more advantageous way of joining solid bodies to one another via covalent bonds at relatively low temperatures.

The present invention provides a process for joining the substantially smooth surfaces of two solid bodies to one another using organosilicon compounds, which process is characterised in that a monomolecular layer of a compound of the general formula

$$S_y[(CH_2)_xSi(OR)_3]_2 \qquad (I)$$

in which:
R denotes methyl, ethyl, propyl, in particular methyl, ethyl,
x denotes 1, 2, 3 or 4, in particular 3
y denotes 2–6, in particular 2,
is applied to the surfaces of both solid bodies. A covalent bonding of the molecules of the compound I to the hydroxide groups, e.g. of the silicon surface, takes place. The solid body surfaces are then brought into contact with one another.

First of all van der Waals interactions occur between organic molecules that are fixed on oppositely facing wafers.

During a subsequent heat treatment at ca. 170° C. the S—S bonds rupture, with the formation of highly reactive species having unpaired electrons (free radicals).

If now two free radicals that are bound to oppositely facing wafer surfaces react with one another, a covalent bond is formed at the interface (FIG. 1). The interface energy rises (from 20 to 300–400 $mJ/m^2$).

In this way it is possible to covalently join such surfaces via the compound according to formula(I) present in a monomolecular layer on the substrate surface. Covalent bonds have a significantly higher stability than the van der Waals interactions or the hydrogen bridge bonds described in the prior art.

The process according to the invention is particularly suitable for hydrophilic surfaces. These are produced optionally by treatment with for example mixtures of $H_2SO_4$ and $H_2O_2$ solutions. In a preferred embodiment one of the compounds according to formula (I) is applied to the substrate (surface) from a dilute solution of the compound in an organic solvent. The concentration of the compound according to the general formula (I) in these solutions is >0 to $\leq 10^{-3}$ mol/l.

Suitable solvents include saturated cyclic, branched and unbranched and aromatic hydrocarbons, for example toluene and hexane.

Solids to be treated according to the invention are understood to include in particular those consisting of silicon, silicon dioxide, sapphire ($Al_2O_3$), gallium arsenide (GaAs) or gold. These solids (substrates) either have a natural oxide layer (Si,$SiO_2$,$Al_2O_3$, GaAs), or can be coated with an oxide layer, for example Y—Ba—Cu—O, and then react like a hydrophilic Si surface.

The process is generally carried out as follows:

A suitable substrate is exposed in an inert gas atmosphere to a ca. $10^{-3}$ molar solution of (I) in toluene. After ca. 5 hrs the substrate is removed from the solution, washed successively with toluene, acetone and methanol, and is then treated twice for 2 minutes in methanol in an ultrasound bath.

The solvent residues are then removed from the wafers by gentle heating combined with simultaneous centrifugation (3000 r.p.m., 5 minutes).

The wafers are now thoroughly rinsed with superpure water in order to remove dust particles, next re-centrifuged to dryness, and then contacted with one another. Van der Waals forces are produced spontaneously between the organic molecules immobilised on oppositely facing wafer sides. The wafer pair is next heated for 5 minutes at 170° C. on a heated plate and then cooled to room temperature. After this treatment covalent bonds have formed between the wafers.

In an advantageous embodiment the compound according to formula (I) is converted into the gaseous phase and then deposited in a monomolecular layer on the surface.

An application from the gaseous phase may be carried out for example in a desiccator. For this purpose the desiccator in which the substrate as well as compound (I) are contained is evacuated to a pressure of a few mbar. The line to the vacuum pump is then disconnected. After 5 hrs the substrates have been coated with a monolayer of the organic sulfide and can be contacted, as described above.

In an embodiment of the invention the reaction can be initiated using UV light.

The invention also provides the structural element produced by this process, comprising two solid bodies whose surfaces have been covalently joined to one another via the monomolecular layers formed on the surfaces by the compounds according to formula (I).

DETAILED DESCRIPTION OF THE PREFERRED EMBODIMENTS

EXAMPLE

Figure 1:
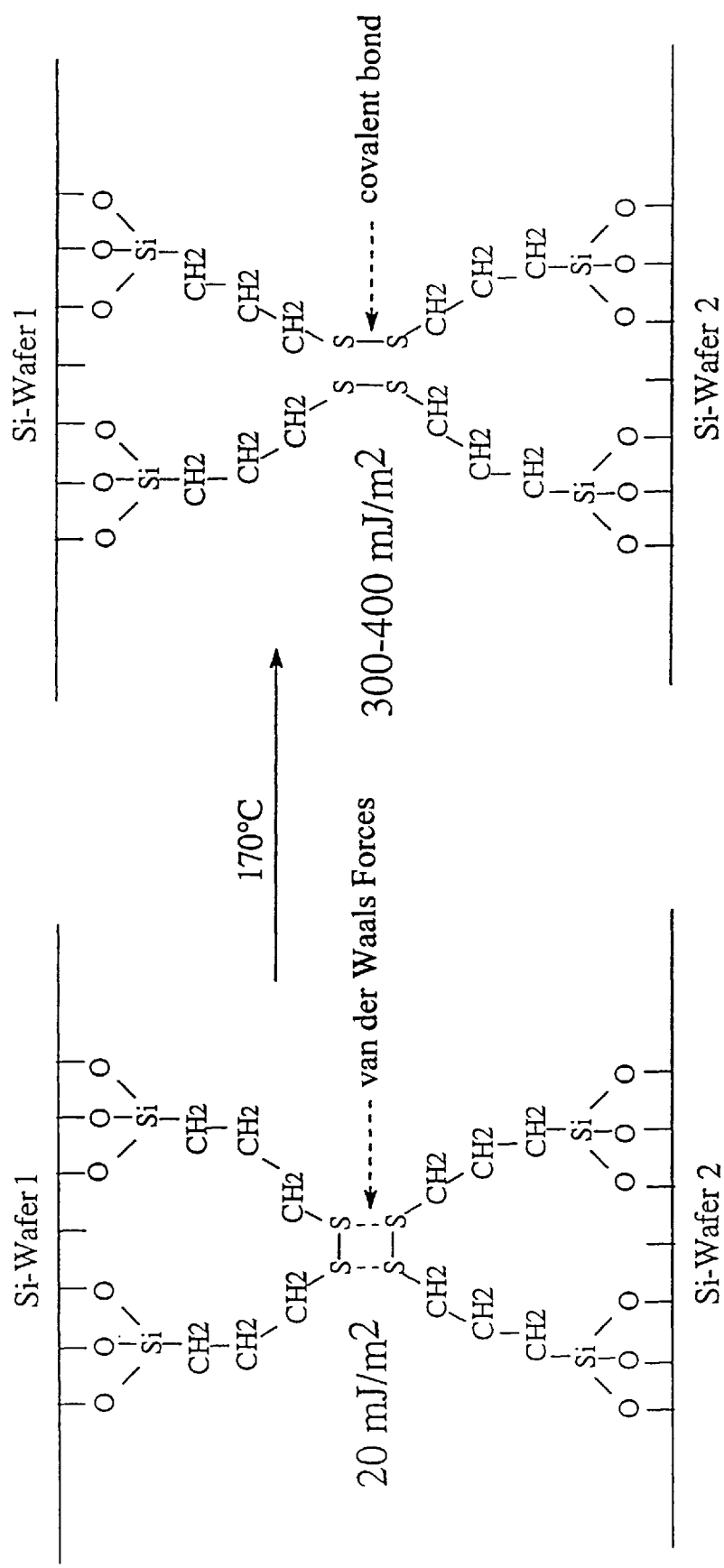
FIG. 1 illustrates this bond by way of example when a bis(alkoxysilylpropyl)disulfane is used.

A comparison of the composite solid bodies (Si) produced according to the prior art (LB film) and the process according to the invention (disulfane Si 266) gives the following results:

| Parameter | LB-Film (Adv. Mater. 1997) | Si 266 (DEGUSSA) |
|---|---|---|
| ML in the interface | 4 | 2 |
| Thickness in the interface | ca. 8 nm | ca. 1 nm |
| Bond strength at RT | 100–350 mJ/m² | ca. 20 mJ/m² |
| Bond strength after heat treatment | Decomposition at T > 60° C. | 300–400 mJ/m² (170° C.) |
| WW Substrate/film | van der Waals | covalent bonds |
| WW ML/ML | van der Waals + entanglements | covalent bonds |
| Deposition method | Langmuir-Blodgett | adsorption from solution |

ML: Monolayer
RT: Room temperature
WW: Interaction

Bond energies can be increased by optimising the reaction parameters: Si 266—20° C.: 50–80 mJ/m²; Si 266—160° C. (3 min): 400–500 mJ/m² or UV-Licht (365 nm, 7 min):750 mj/m²
Si 69—20° C.: 60–90 mJ/m²; Si 69–80° C. (3 min) or 20° C. (10–14 days): 400 mJ/m²

The reaction between two substances that are coated with a monolayer ot Si 266 can be initiated by irradiation with UV light (365 nm, 7 mins). In order to permit irradiation with UV light, an Si disc is replaced by a quartz wafer.

What is claimed is:

1. A process for joining substantially smooth surfaces of two solid bodies using organosilicon compounds, comprising:
    applying a monomolecular layer of a compound of the general formula, $$S_y[(CH_2)_xSi(OR)_3]_2 \tag{I}$$

in which
    R denotes methyl, ethyl, propyl
    x denotes 1, 2, 3 or 4,
    Y denotes 2–6,
to the substantially smooth surfaces of the two solid bodies and bringing the surfaces of the two solid bodies into contact.

2. The process according to claim 1, comprising:
    using a bis(alkoxysilylpropyl)disulfane as the compound of the formula (I).

3. The process according to that claim 1, wherein the solid bodies have a hydrophilic surface.

4. The process according to claim 1, comprising using the compound according to formula (I) in the form of a solution having a concentration of >0 to $10^{-3}$ mole/l.

5. The process according to claim 1, comprising:
    carrying out the process at temperatures of 10 to 30° C.

6. The process according to claim 1, comprising applying the compound to formula (I) from the vapour phase.

7. The process according to claim 1, comprising using UV light to initiate the reaction.

8. Composite structural element, for microelectronics or micromechanics, comprising two solid bodies having surfaces that have been joined to one another via monomolecular layers formed by compounds according to formula (I) using the process of claim 1.

9. The process according to claim 5, further comprising a heat treatment at temperatures of 150 to 200° C.

* * * * *